US00RE39761E

(19) United States
(12) Reissued Patent
Cahill

(10) Patent Number: US RE39,761 E
(45) Date of Reissued Patent: Aug. 7, 2007

(54) LAMINATE WALL STRUCTURE

(75) Inventor: John Cahill, Hudson, OH (US)

(73) Assignee: National Shelter Products, Inc., Issaquah, WA (US)

(21) Appl. No.: 10/898,091

(22) Filed: Jul. 23, 2004

Related U.S. Patent Documents

Reissue of:
(64) Patent No.: 6,656,858
Issued: Dec. 2, 2003
Appl. No.: 08/982,559
Filed: Dec. 2, 1997

(51) Int. Cl.
*B32B 5/18* (2006.01)
*B32B 5/24* (2006.01)

(52) U.S. Cl. ..... 442/370; 442/221; 442/246; 442/247; 442/248; 442/250; 442/251; 442/254; 442/259; 442/260; 442/261; 442/263; 442/268; 442/286; 442/394; 428/221; 428/304.4; 428/316.6; 428/317.1; 428/480; 428/507; 428/511; 428/512; 52/309.1

(58) Field of Classification Search ..... 442/221, 442/268, 246, 247, 248, 250, 251, 254, 259, 442/260, 261, 263, 286, 370, 394; 428/221, 428/304.4, 317.1, 480, 507, 511, 512, 316.6; 52/309.1
See application file for complete search history.

(56) References Cited

U.S. PATENT DOCUMENTS

| | | | | | |
|---|---|---|---|---|---|
| 2,928,456 | A | * | 3/1960 | Potchen et al. | 442/224 |
| 3,616,020 | A | * | 10/1971 | Whelan et al. | 427/209 |
| 3,971,867 | A | * | 7/1976 | Randall | 428/45 |
| 4,011,357 | A | * | 3/1977 | Haase | 428/215 |
| 4,082,882 | A | * | 4/1978 | Weinstein et al. | 442/286 |
| 4,088,805 | A | * | 5/1978 | Wiegand | 442/370 |
| 4,350,730 | A | * | 9/1982 | Cyr et al. | 428/215 |
| 4,363,848 | A | * | 12/1982 | Le Duc et al. | 442/226 |
| 4,418,108 | A | * | 11/1983 | Lin | 428/139 |
| 4,425,396 | A | * | 1/1984 | Hartman | 428/220 |
| 4,486,995 | A | * | 12/1984 | Allen et al. | 52/309.8 |
| 4,764,238 | A | * | 8/1988 | Dastin et al. | 156/245 |
| 4,780,167 | A | * | 10/1988 | Hill | 156/245 |
| 5,053,265 | A | * | 10/1991 | Alexander | 428/182 |
| 5,098,778 | A | * | 3/1992 | Minnick | 442/224 |
| 5,451,451 | A | * | 9/1995 | Minnick | 442/247 |
| 5,695,870 | A | * | 12/1997 | Kelch et al. | 428/318.4 |
| 5,863,091 | A | * | 1/1999 | Shepherd et al. | 296/204 |
| 6,119,422 | A | * | 9/2000 | Clear et al. | 52/309.8 |

FOREIGN PATENT DOCUMENTS

| | | | |
|---|---|---|---|
| CA | 741725 | * | 8/1966 |
| CA | 2214302 | * | 2/1998 |
| GB | 1346780 | * | 2/1974 |
| GB | 1348271 | * | 3/1974 |

* cited by examiner

*Primary Examiner*—Norca Torres
(74) *Attorney, Agent, or Firm*—Flynn, Thiel, Boutell & Tanis, P.C.

(57) ABSTRACT

A laminate wall structure which can be used as an exterior wall in manufactured housing and site built construction is made up of a low density layer having a density of from about one-half pound to three pounds per cubic foot, a second, reinforcing layer laminated to the low density layer and, optionally, a cellulosic layer laminated to the second, reinforcing layer. The low density layer is preferably a foamed polymer layer, the second, reinforcing layer is a polymer fabric, a biaxially oriented polymeric film or a fiberglass reinforced material and the cellulosic layer can be impregnated with an adhesive and/or resin in order to strengthen the laminate structure. This laminate wall structure has a low weight and yet is strong enough to meet wind zone wall diaphragm requirements for housing construction.

47 Claims, 1 Drawing Sheet

LAMINATE WALL STRUCTURE

Matter enclosed in heavy brackets [ ] appears in the original patent but forms no part of this reissue specification; matter printed in italics indicates the additions made by reissue.

*This application is a reissue application of U.S. Ser. No. 08/982,559, filed Dec. 2, 1997, now U.S. Pat. No. 6,656,858, issued on Dec. 2, 2003.*

FIELD OF THE INVENTION

This invention relates to a laminate wall structure which can be used in wall sheathing applications. The inventive laminate wall structure is lightweight, easy to fabricate and yet meets governmental wind load wall diaphragm requirements for manufactured housing for transverse wind loading.

BACKGROUND OF THE INVENTION

Wall structures for homes and buildings in addition to having minimum mechanical strength and moisture resistance, have to be able to meet government regulations with respect to transverse wind loading. Conventional materials used in exterior wall structures are plywood, orientated strand board, fiberboard and a wall structure made of several layers of Kraft paper compressed and adhered together to form a panel. These conventional wall materials tend to be expensive, have a poor moisture resistance, are heavy and difficult to install.

U.S. Pat. No. 4,082,882 discloses a fiberglass reinforced plywood structural sandwich for use as a truck, trailer, van or inter modal container wall which is made up of a fiberglass reinforced plywood plastic unit having one or both facings in the form of a sheet or film of a-high-impact, weather-resistant, low-haze, non-brittle, substantially non-porous acrylic composition.

U.S. Pat. No. 4,418,108 discloses a composite roofing panel made of a fibrous glass board, a layer of foamed-in-place plastic foam and a perforated sheet disposed between the board and the plastic foam. This sheet is made of a material such as paper, wax paper, or a thermoplastic film.

U.S. Pat. No. 4,425,396 discloses an insulated panel made up of a rigid foam layer of a synthetic organic polymeric foam, a protective weathering layer of a thermoplastic sheet material and a flexible backer layer of stereoreticulate material provided between the foam and the weathering layers.

U.S. Pat. No. 5,053,265 discloses a moisture-impervious panel having an intermediate layer of a water-swellable colloidal clay sandwiched between two layers of sheet material such as woven or nonwoven fabric or paperboard.

U.S. Pat. No. 4,088,805 shows a reinforced thermoplastic foam sheet made up of outer layers of low density thermoplastic foam and a thermoplastic film and a central layer having a reinforcing net or net-like structure.

However, to date, there does not exist a lightweight laminate which can be used in exterior wall construction and is inexpensive, easy to install, has a high moisture resistance and meets government requirements with respect to transverse wind-loading. The present invention was arrived at in order to satisfy these needs.

SUMMARY OF THE INVENTION

It is an object of the present invention to provide a wall laminate structure which is lightweight, easy to install, inexpensive, has a high moisture resistance and meets building code requirements with respect to transverse wind loading.

This and other objects of the present invention are accomplished by providing a laminate wall structure made up of a first low density layer having a density of from about 0.5 to 3 pounds per cubic foot and a second, reinforcing layer comprising a polymeric fabric, a biaxially oriented polymeric film or a fiberglass reinforced paper or plastic material laminated to the first layer. In another embodiment of the present invention, a third layer comprising a cellulosic material is laminated to the second, reinforcing layer.

DETAILED DESCRIPTION

Figure 1:
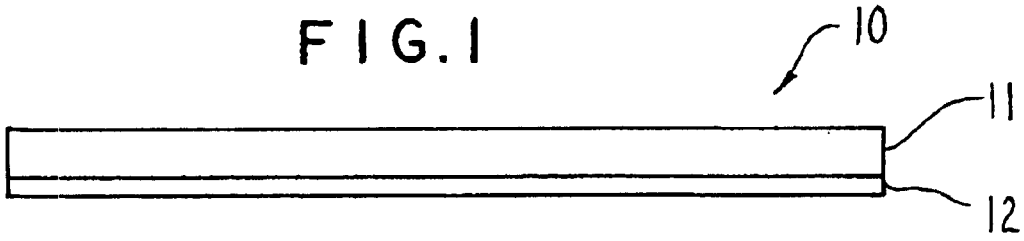
FIG. 1 is a sectional view of a wall laminate structure according to a first embodiment of the present invention.
Figure 2:
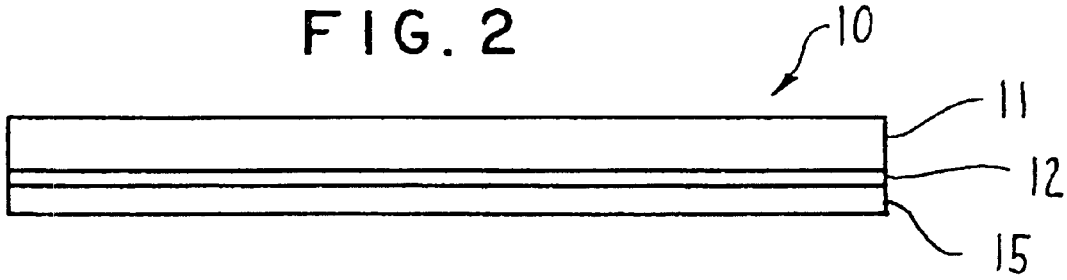
FIG. 2 is a sectional view of a wall laminate structure according to a second embodiment of the present invention.

FIG. 1 generally illustrates a wall laminate structure 10 according to a first embodiment of the present invention and FIG. 2 generally illustrates a wall laminate structure 10 according to a second embodiment of the present invention. This wall laminate structure 10 is made up of a low density layer 11 having a density of from about 0.5 to 3 pounds per cubic foot, a second, reinforcing layer 12 of a polymer fabric, a biaxially oriented polymeric film or a fiberglass reinforced paper or plastic material laminated to the low density layer 11 and, in the second embodiment of the present invention, a cellulosic layer 15 laminated to the second, reinforcing layer 12.

The low density layer 11 can be made of a foamed plastic material or low density fiberboard. As to the foamed plastic material, polystyrene, polyurethane or a urethane derivative is particularly suitable while the fiberboard can be made of cane fiber, wood fiber or cellulosic fiber.

The polymer fabric layer 12 is preferably made of a thermoplastic material such as a polyester or a polyolefin. As to the polyolefin, polyethylene and polypropylene are particularly preferred, with polypropylene being the most preferred material. An example of the polymer fabric material 12 is Darco® by National Shelter Products. The polymer fabric layer 12 can be woven or unwoven.

The biaxially oriented polymeric film 12 is made of a thermoplastic material such as a polyolefin or a polyester. The polyolefin is preferably polyethylene or polypropylene. A suitable biaxially oriented polymeric. film 12 for use in the present invention is Interpluse® manufactured by Inteplast of Livingston, N.J.

As the fiberglass reinforced paper material 12, any suitable paper material may be used as long as it possesses mechanical properties suitable for the purposes of the present invention. The fiberglass reinforced plastic material 12 can be any suitable thermoplastic material such as a polyolefin or a polyester. Particularly preferred polyolefins are polyethylene and polypropylene.

The cellulosic layer 15 provides additional stiffness to the wall laminate structure 10 and can be made of paper, paper fiberboard; plastic coated paper or plastic coated paper fiberboard. As to the paper, 40 pound Kraft paper is particularly preferred in the present invention. The Kraft paper can be provided with a one-half mil polyethylene coating on both sides thereof. As a coating for the fiberboard and the paper, polyethylene or polypropylene are used. The cellulosic layer 15 may be impregnated with an adhesive and/or a resin to improve the mechanical strength thereof. As to the adhesive or resin, a urethane, polyester, phenolic, epoxy, phenol-aralkyl and resorcinol resin can be used but the present invention is not limited thereto. Additionally, other additives such as plasticizers, flame retardants, lubricants and mineral fillers can be incorporated into the resin or adhesive in order to modify its properties.

If the cellulosic layer 15 is impregnated, it is preferably impregnated to a degree of from about 3 to 100% saturation. The preferred degree of impregnation is from about 25 to about 50%, with about 35%, being particularly preferred. The manner of applying the resin or adhesive to the cellulosic layer 15 is not critical as long as the layer is impregnated thereby. The resin or adhesive may be applied to the cellulosic layer 15 by coating the resin and/or adhesive on the layer using in-line rolls or the cellulosic layer 15 may be pulled through a bath of the resin and/or adhesive or the resin and/or adhesive can be sprayed on the surface of the cellulosic layer.

The low density layer 11, polymer fabric layer 12 and cellulosic layer 15 can be laminated together through the use of an adhesive or through heat and pressure bonding. If the cellulosic layer 15 is impregnated with a resin and/or adhesive, the polymer fabric layer 12 may be attached thereto and the resulting laminate subjected to pressure for a period of time necessary to adequately secure the polymer fabric layer 12 to the cellulosic layer 15. The low density layer 11 then may be bonded to the polymer fabric layer 12.

Figure 3:
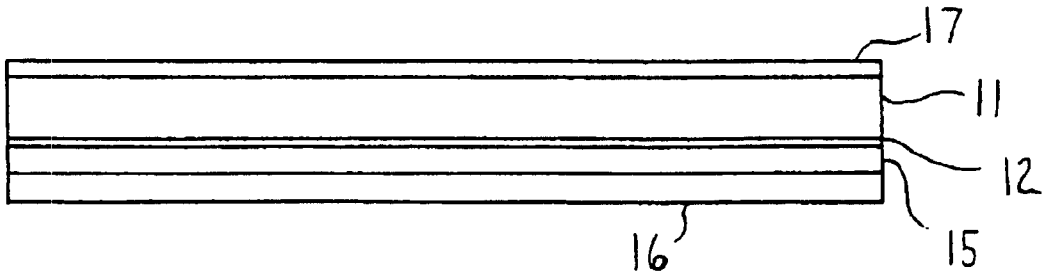
FIG. 3 is a sectional view of the wall laminate structure according to the second embodiment of the present invention provided between interior and exterior wall layers.

As shown in FIG. 3, an exterior layer 16 can be laminated to the cellulosic layer 15 and an interior layer 17 can be laminated to the low density layer 11. The exterior layer 16 can be exposed to the outside environment and made of a fiberglass reinforced plastic as is typically used in the industry. However, layer 16 is typically covered with a durable decorative material that is exposed to the outside environment. The interior layer 17 may be exposed to the interior environment of the wall structure and can be made of any suitable material such as a paneling material. However, layer 16 typically faces a wall cavity that is filled with fiberglass batt insulation and separated from the interior environment by a gypsum wallboard. The exterior layer 16 and the interior layer 17 can be bonded to the laminate wall structure of the present invention by any suitable means depending on the material used.

EXAMPLE

Negative pressure tests were performed on exterior side walls according to the present invention in order to determine their suitability as wall structures for manufactured housing. Expanded polystyrene (EPS) foamboard with woven polyethylene (PE) fabric facing surfaces were attached to framing members with 1"×1½"×16 Ga. staples in accordance with Section 3280.401(b) of the Federal manufactured Home Construction and Safety Standards (FMHCSS).

TEST SPECIMEN DESCRIPTION

A. Materials

1. Studs: 2×6, Stud Grade SPF at 16" o.c.
2. Top Plate: Single 1×6, Un-Graded SPF.
3. Bottom Plate: Single 1×6, Un-Graded SPF.
4. Sheathing: ⅜", EPS board with woven PE fabric facers.
5. Siding: 0.038", DL/D4 Vinyl Siding.

B. Fastening

Top plate attached to studs with five (5) 7/16"×1½"×16 Ga. staples per stud end.

Sheathing fastened to studs with 1"×1½"×16 ga. staples, angled 45 degrees at 3" o.c.

Sheathing fastened to top and bottom plates with 1"×1½"×16 Ga. staples at 3" o.c.

Siding fastened to framing with 7/16×1½"×16 Ga. staples at 16" o.c.

C. Construction Steps

The 48"×90" test sample was first assembled with 2×6 studs that were 88.50" long. The 1×6 top and bottom plates were 48" long. The sheathing material was placed on top of the framing members and fastened with staples as described above. The sheathing panels were oriented so the long side of the panels were parallel to the studs. The siding material was then placed on top of the sheathing material and fastened with staples as described above. The polyethylene sheeting (6 mil) was placed over the test fixture and between the wall framing and sheathing/siding materials. The polyethylene was carefully pleated both vertically and horizontally along the inside of the test fixture.

TEST SET UP AND PROCEDURE

The test was conducted in accordance with the ultimate load test procedures in Section 3280.401(b) of the Federal Manufactured Home Construction and Safety Standards. An 11¼" deep wood box was built 1" wider than the test sample. The test sample was placed horizontally in the test fixture with the sheathed side facing down. The wall top and bottom plates were, securely fastened to the inside of the wood box. The wood box was then placed on a sealed steel table. The polyethylene sheathing was placed over the top of the test assembly (between the framing and the sheathing), and sealed to the table. This allows the entire surface of the wall to be exposed to the full negative loads. The polyethylene sheet was carefully pleated to prevent it from stretching too tight and picking up load as the wall deflects downward. If the pleating is not done, it may result in composite action between the polyethylene and the wall sample. The uniform load was applied by evacuating the air below the test specimen using a vacuum pump. The applied load was measured with a water manometer capable of reading in 0.1 inch increments. The load was applied in approximate ¼ design live load increments at 10 minute intervals until 1.25 times design load was reached. The load was then increased to 2.5 times design load or until failure occurred. The load in inches of water column was converted to pounds per square foot (psf) by using: 1 inch (of water column)=5.2 psf. Deflections were taken using dial indicators capable of reading in 0.001" increments. The deflections were taken at the mid-points of the two center studs, and are for information purposes only.

TEST RESULTS

A total of three (3) specimens were tested. The descriptions of ultimate loads and types of failures observed are as follows:

| TEST | ULTIMATE LOAD | MODE OF FAILURE |
|---|---|---|
| #1 | 117.5 (PSF) | Vinyl siding and EPS board pulled over staples. |
| #2 | 109.2 (PSF) | Vinyl siding and EPS board pulled over staples. |

-continued

| TEST | ULTIMATE LOAD | MODE OF FAILURE |
|---|---|---|
| #3 | 119.1 (PSF) | Vinyl siding and EPS board pulled over staples. |

The Average Ultimate Load = 115.3 PSF
The Required Horizontal Load = 38.0 PSF (For HUD Code Wind Zone II-Interior)
The Required Horizontal Load = 46.0 PSF (For HUD Code Wind Zone III-Interior)
The Allowable Horizontal Design Load is: (Average Ultimate Load)/(Safety Factor) = (115.3/2.5) = 46.2 PSF > 46.0 PSF As such, the wall laminate structures of the present invention meet the governmental wind load wall diaphragm requirements.

Although a particularly preferred embodiment of the present invention has been disclosed in detail for illustrative purposes, it will be recognized in variations or modifications of the disclosed invention, including the use of equivalent components, lying within the scope of the present invention.

What is claimed is:

1. In a wall structure that is contained in a building structure exposed to transverse wind loading, the improvement comprising said wall structure containing a first layer *comprising a foamed material* having a density of about 0.5–3 lb./ft.$^3$ and a second, reinforcing layer of a woven polymer fabric directly bonded to the first layer*, said wall structure meeting the Ultimate Load Test criteria set forth in 24 C.F.R § 3280.401(b)*.

2. The wall structure of claim 1, additionally comprising a third layer comprising a [cellulostic] *cellulosic* material laminated to said second, reinforcing layer.

3. The wall structure of claim 2, wherein the cellulosic layer has a plastic film formed thereon.

4. The wall structure of claim 2, wherein the cellulosic layer is impregnated with a member selected from the group consisting of a resin, an adhesive and mixtures thereof.

5. The wall structure of claim 4, wherein said cellulosic layer is impregnated with a urethane.

6. The wall structure of claim 4, wherein said cellulosic layer is impregnated with a polyester.

7. The wall structure of claim 4, wherein said cellulosic layer is impregnated with a urethane,and a polyester.

8. The wall structure of claim 4 wherein said cellulosic layer is impregnated to a degree of saturation of from about 3 to 100%.

9. The wall structure of claim 4, wherein said cellulosic layer is impregnated to a degree of saturation of from about 25 to 50%.

10. The wall structure of claim 4, wherein said cellulosic layer is impregnated to a degree of saturation of about 35%.

[11. The wall structure of claim 1, wherein said first layer comprises a foamed material.]

12. The wall structure of [claim 11] *claim 1*, wherein said foamed material is an organic material.

13. The wall structure of claim 12, wherein said organic material is selected from the group consisting of polystyrene and polyurethane.

[14. The wall structure of claim 1, wherein said first layer comprises a fiberboard material.]

15. The wall structure of claim 1, wherein said second, reinforcing layer is made of a thermoplastic material.

16. The wall structure of claim 15, wherein said thermoplastic material is selected from the group consisting of polyethylene and propylene.

[17. The wall structure of claim 15, wherein the polymer fabric is unwoven.]

18. The wall structure of claim 1, wherein *a* cellulosic layer is laminated to the second, reinforcing layer, an exterior layer is laminated to the cellulosic layer and an interior layer is laminated to the first layer.

[19. The wall structure of claim 18, wherein said second, reinforcing layer is a biaxially oriented polymeric film.]

20. In a wall structure that is contained in a building structure exposed to transverse wind loading, the improvement comprising said wall structure containing a first layer *comprising a foamed material* having a density of about 0.5–3 lb./ft.$^3$, a second, reinforcing layer [selected from the group] consisting of a polymer fabric [and a biaxially oriented polymeric film] directly bonded to the first layer and a cellulosic layer selected from the group consisting of paper, paper fiberboard, plastic-coated paper and plastic-coated paper fiberboard laminated to the second, reinforcing layer*, said wall structure meeting the Ultimate Load Test criteria set forth in 24 C.F.R § 3280.401(b)*.

21. The wall structure of claim 20, wherein an exterior layer is laminated to the cellulosic layer and an interior layer is laminated to the first layer.

[22. The wall structure of claim 21, wherein said second, reinforcing layer is a biaxially oriented polymeric film.]

23. The wall structure of claim 20, wherein said first layer comprises a foamed material.

24. The wall structure of claim 23, wherein said foamed material is an organic material.

25. The wall structure of claim 24, wherein said organic material is selected from the group consisting of polystyrene and polyurethane.

26. The wall structure of claim 20, wherein said [first]*cellulosic* layer comprises a fiberboard material.

27. The wall structure of claim 20, wherein said second, reinforcing layer is a polymer fabric made of a thermoplastic material.

28. The wall structure of claim 27, wherein said thermoplastic material is selected from the group consisting of polyethylene and polypropylene.

29. The wall structure of claim 27, wherein the polymer fabric is woven.

[30. The wall structure of claim 20, wherein said second, reinforcing layer is a biaxially oriented polymeric film made of a thermoplastic resin.]

[31. The wall structure of claim 30, wherein the thermoplastic material is a polyolefin or a polyester.]

32. The wall structure of claim 20, wherein the cellulosic layer has a plastic film formed thereon.

33. The wall structure of claim 20, wherein the cellulosic layer is impregnated with a member selected from the group consisting of a resin, an adhesive and mixtures thereof.

34. The wall structure of claim 33, wherein said cellulosic layer is impregnated with a urethane.

35. The wall structure of claim 33, wherein said cellulosic layer is impregnated with a polyester.

36. The wall structure of claim 33, wherein said cellulosic layer is impregnated with a urethane and a polyester.

37. The wall structure of claim 33, wherein said cellulosic layer is impregnated to a degree of saturation of from about 3 to 100%.

38. The wall structure of claim 20, wherein said cellulosic layer is Kraft paper.

*39. The wall structure of claim 20, wherein the second, reinforcing layer is directly bonded to the first layer through the use of an adhesive.*

*40. In a wall structure that is contained in a building structure exposed to transverse wind loading, the improvement comprising said wall structure containing a first layer*

*comprising a foamed material having a density of about 0.5–3 lb./ft.$^3$ and a second, reinforcing layer of a woven polymer fabric directly bonded to the first layer through the use of an adhesive, said wall structure meeting the Ultimate Load Test criteria set forth in 24 C.F.R § 3280.401(b).*

*41. The wall structure of claim 40, wherein said foamed material is an organic material.*

*42. The wall structure of claim 41, wherein said organic material is polystyrene.*

*43. The wall structure of claim 40, wherein the second, reinforcing layer is made of a thermoplastic material.*

*44. The wall structure of claim 43, wherein the thermoplastic material is a polyolefin.*

*45. The wall structure of claim 44, wherein the polyolefin is polyethylene or polypropylene.*

*46. A laminate wall structure for use in wall sheathing applications in manufactured housing and site built construction, the laminate wall structure comprising:*

*a first layer comprising a foamed plastic material having a density of about 0.5–3 lb/ft.$^3$, and*

*a second, reinforcing layer of a woven polymer fabric directly bonded to the first layer,*

*wherein said laminate wall structure meets the Ultimate Load Test criteria set forth in 24 C.F.R. §3280.401(b) for a design wind load of ±46 PSF.*

*47. The laminate wall structure according to claim 46, wherein the laminate wall structure meets the Ultimate Load Test criteria set forth in 24 C.F.R. §3280.401(b) for a design wind load of ±38 PSF.*

*48. The laminate wall structure according to claim 46, wherein the foamed plastic material is selected from the group consisting of polystyrene and polyurethane.*

*49. The laminate wall structure according to claim 47, wherein the foamed plastic material is selected from the group consisting of polystyrene and polyurethane.*

*50. The laminate wall structure according to claim 46, wherein the second, reinforcing layer is directly bonded to the first layer through the use of an adhesive.*

*51. The laminate wall structure according to claim 47, wherein the second, reinforcing layer is directly bonded to the first layer through the use of an adhesive.*

*52. The laminate wall structure according to claim 46 further comprising:*

*a cellulosic layer selected from the group consisting of paper, paper fiberboard, plastic-coated paper and plastic-coated paper fiberboard laminated to the second, reinforcing layer.*

*53. The laminate wall structure according to claim 47, further comprising:*

*a cellulosic layer selected from the group consisting of paper, paper fiberboard, plastic-covered paper and plastic-coated paper fiberboard laminated to the second, reinforcing layer.*

*54. The wall structure of claim 20, wherein the polymer fabric is unwoven.*

* * * * *

UNITED STATES PATENT AND TRADEMARK OFFICE

CERTIFICATE OF CORRECTION

PATENT NO. : RE 39,761 E
APPLICATION NO. : 10/898091
DATED : August 7, 2007
INVENTOR(S) : John Cahill It is certified that error appears in the above-identified patent and that said Letters Patent is hereby corrected as shown below:

Column 5, line 65; change "polyethylene and propylene."
to --polyethylene and polypropylene.--

Column 8, line 23; change "paper, paper fiberboard, plastic-covered paper"
to --paper, paper fiberboard, plastic-coated paper--

Signed and Sealed this

Twenty-fifth Day of December, 2007

JON W. DUDAS
*Director of the United States Patent and Trademark Office*